(12) United States Patent
Kim et al.

(10) Patent No.: US 9,383,619 B2
(45) Date of Patent: Jul. 5, 2016

(54) BISTABLE ELECTROCHEMICAL MIRROR

(71) Applicant: University-Industry Foundation, Yonsei University, Seoul (KR)

(72) Inventors: Eunkyoung Kim, Seoul (KR); Chihyun Park, Gyeonggi-do (KR); Hai jin Shin, Gyeonggi-do (KR)

(73) Assignee: University—Industry Foundation, Yonsei University, Seoul (KR)

( * ) Notice: Subject to any disclaimer, the term of this patent is extended or adjusted under 35 U.S.C. 154(b) by 0 days.

(21) Appl. No.: 14/549,877

(22) Filed: Nov. 21, 2014

(65) Prior Publication Data

US 2015/0146276 A1    May 28, 2015

(30) Foreign Application Priority Data

Nov. 22, 2013 (KR) ........................ 10-2013-0142566

(51) Int. Cl.
| | | |
|---|---|---|
| G02F 1/153 | (2006.01) | |
| G02F 1/15 | (2006.01) | |
| G02F 1/155 | (2006.01) | |

(52) U.S. Cl.
CPC .............. *G02F 1/1506* (2013.01); *G02F 1/155* (2013.01)

(58) Field of Classification Search
USPC ................................. 359/269–280
See application file for complete search history.

(56) References Cited

U.S. PATENT DOCUMENTS

| | | | | |
|---|---|---|---|---|
| 4,762,401 | A * | 8/1988 | Baucke | .................. G02F 1/1533 359/266 |
| 5,056,899 | A | 10/1991 | Warszawski | |
| 5,764,401 | A | 6/1998 | Udaka et al. | |
| 5,864,420 | A | 1/1999 | Udaka et al. | |
| 5,880,872 | A | 3/1999 | Udaka | |
| 6,301,039 | B1 * | 10/2001 | Tench | .................. G02F 1/1506 359/266 |
| 6,400,491 | B1 | 6/2002 | Tench et al. | |

FOREIGN PATENT DOCUMENTS

| | | |
|---|---|---|
| FR | 2504290 A1 | 10/1982 |
| JP | 4400914 B2 | 1/2010 |
| KR | 1020030040361 A | 5/2003 |
| KR | 1020130109842 A | 10/2013 |

OTHER PUBLICATIONS

Duchene et al., "Electrolytic Display", IEEE Transactions on Electron Devices, vol. ED-26, No. 8, pp. 1243-1245 (1979).
Ziegler et al., "Reversible Electrodeposition of Bismuth Thin Films for Flat Panel Display Applications", Proceedings of the Symposium on Electrochemically Deposited Thin Films, Electrochem. Soc., Inc., vol. 93-26, pp. 353-361 (1993).
Ziegler et al., "Nucleation and Growth of Thin Film Reversible Electrodeposition Electrochromic Materials", Proceedings of the Second Symposium on Electrochemically Deposited Thin Films, Electrochem. Soc., Inc., vol. 94-31, pp. 23-33 (1995).
Ziegler et al., "Applications of reversible electrodeposition electrochromic devices", Solar Energy Materials and Solar Cells 39, pp. 317-331 (1995).
Zaromb, "Theory and Design Principles of the Reversible Electroplating Light Modulator", Journal of the Electrochem. Soc., vol. 109, pp. 903-912 (1962).

* cited by examiner

*Primary Examiner* — Mohammed Hasan
(74) *Attorney, Agent, or Firm* — The Webb Law Firm (57) ABSTRACT

The present invention relates to a switchable infrared ray-visible ray reflection electrochemical mirror having high electrochemical stability and bistability, in which a stripping phenomenon of a metal thin film can be prevented and bistability can be improved through a process of increasing electrochemical stability of a reflective film from an electrode composition and an ionic liquid electrolyte composition having various compositions. In the proposed electrochemical mirror apparatus, since the metal thin film formed by electric reduction is not stripped from a transparent electrode through a surface treatment process, a more stable apparatus can be provided, and even though a voltage is not applied to the metal thin film, the thin film is prevented from being oxidized by using an optimized ionic liquid electrolyte, thus providing the effective electrochemical mirror apparatus where the metal thin film is continuously maintained.

15 Claims, 5 Drawing Sheets

BISTABLE ELECTROCHEMICAL MIRROR

CROSS-REFERENCE TO RELATED APPLICATION

The application claims priority to Korean Patent Application No. 10-2013-0142566 filed Nov. 22, 2013, the disclosure of which is hereby incorporated in its entirety by reference.

TECHNICAL FIELD

The present invention relates to an electrically switchable electric mirror apparatus, and more particularly, to a mirror switching device which includes surface-treated transparent electrodes, has high electrochemical stability and bistability according to a constitution of an electrolyte having various compositions positioned between the transparent electrodes, and exhibits high stability and reflectance/transmittance in 1,000 cycles or more of switching.

BACKGROUND ART

A switching-type mirror adjusting reflection and light transmittance by external stimulation has been researched by various methods. For example, a chromic glass where transmittance can be autonomously adjusted is being researched and developed. Examples of a kind of transmittance variable glass include electrochromic, photochromic, thermochromic, SPD (suspended particle device), and liquid crystal glasses, and the like. In an active transmittance switchable glass, transmittance can be artificially adjusted by applying electricity in an electrochromic, liquid crystal, or SPD mode. Accordingly, the active transmittance switchable glass may be applied to a smart window to adjust an internal temperature of a building by sun light that is incident toward the inside and prevent damage to goods by rays and the like. However, the smart window using the active transmittance switchable glass has problems in that stability is reduced according to an increase in temperature by absorbing sun light, and thus the smart window has limited durability, a response speed is slow, and a cost is relatively high.

Therefore, in order to simultaneously reduce sun light and the resultant increase in temperature, blocking of sun light through reflection rather than absorption is required, and to this end, a demand for a smart window which has variable reflectivity, is stable and low-priced, and has high efficiency is increasing. Accordingly, there is an increasing need for an electric mirror device that can be switched between a mirror state and a transparent state, has stable bistability in each state, and can be switched at a low voltage.

This technology can be applied to various kinds of other use of adjusting light transmission and reflection in addition to the smart window. Examples thereof may include a technology of applying as a dimmer in an eyeglass-type display apparatus by switching a reflection-type and a transmission-type, and a technology of limiting maximum brightness of a strong light source reflected on a rear mirror and a side mirror of transportation means to ensure safety of a driver. A current electrochromic technology includes an electrolyte layer in a light path to cause a reduction in resolution in a section having a refractive index difference and thus cause deterioration of a mirror property.

A light modulation technology through light reflection rather than light absorption is in an attempt by a method such as manufacturing of a photonic crystal structure using a switchable electrochromic material, and shutterization of a mechanical metal mirror, but instantaneous formation and decomposition of a metal mirror layer through electrochemical oxidation and reduction reactions of metal ions is most influential. In the prior art which attempts to use reversible electrodeposition of a metal for light modulation is made, there are demerits in that a deposited material obtained on a transparent substrate exhibits a rough black, grey, or occasionally colored appearance, and poor reflectivity and high light absorbance are exhibited, which become more serious particularly when the deposited material is thick.

A technology of increasing reflectance by adding a white pigment in order to improve a contrast exists in the prior art, and in this connection, there is U.S. Pat. No. 5,056,899 by Warszawski, which relates to a display, but in the case where a reversible electrochemical metal is formed, there is a big demerit in that the metal is fixed in a counter electrode, and therefore it teaches that the technology is unsuitable for a display. The document of the prior art describes that an auxiliary counter electrode reaction is required in order to interrupt metal fixation in a working electrode, which does not cause a pure change in transmission, but low reflectance of the described deposited material is not suitable for adjustable mirrors.

An electrolyte described in the prior art document contains auxiliary oxidation-reduction species (for example, bromide, iodide, or chloride) oxidized (for example, oxidized into bromide, iodide, or chloride) in the counter electrode during a metal deposition period under a high used driving voltage, and the auxiliary oxidation-reduction electrolyte cause extinction of the deposited material on an open circuit by chemical dissolving (for example, $2Ag^0+Br_2 \rightarrow 2AgBr$) of the metal deposited material, so that stability is low, and in most cases, metal deposition in the counter electrode is interrupted. For example, in the case of all electrodeposition apparatuses found in the prior arts such as the patent document by Warszawski [when copper or nickel exists in a counter electrode paste, refer to columns 3 and 4]; a document by Duchene, et al., [Electrolytic Display, IEEE Transactions on Electron Devices, Volume ED-26, Number 8, pp. 1243-1245 (1979.8)]; and French Patent No. 2,504,290 (Oct. 22, 1982), a high switching voltage of 1 V or more is used and stability is low.

A paper by Ziegler, et al., [Electrochem. Soc. Proc. Vol. 93-26, p. 353, 1993] describes research on use of a reversible electrodeposited material made of bismuth in an aqueous solution containing halide anions and trivalent bismuth ions, in which a mol concentration ratio of the halide anions to the trivalent bismuth ions is large, for displays. An oxidation reaction of the halide anions serves as a counter electrode reaction where a write voltage of 1.5 V is used. The obtained deposited material had a dark color and reduced reflectance of an ITO surface.

Succeeding reports by Ziegler, et al., ([Electrochem. Soc. Proc. Vol. 94-31 (1994), p. 23] and [Solar Energy Mater. Solar Cells 39 (1995), p. 317]) describe that addition of copper ions to an electrolyte is required to achieve complete extinction of a deposited material. Further, Ziegler, et al., used a counter electrode reaction in addition to metal electrodeposition/dissolving reactions, but did not obtain a mirror deposited material. Accordingly, the aforementioned documents by Ziegler, et al., do not provide teaching relating to an effect of an electrolyte composition on deposition/dissolving speeds and quality of the mirror electrodeposited material.

U.S. Pat. No. 5,880,872 by Udaka, et al., describes that a working electrode of a reversible electrodeposition structure is decomposed, and thus a life-span of the electrode is shortened by a high voltage required to dissolve a metal film deposited on the electrode. Udaka, et al., describes that the aforementioned result can be prevented by adding alkali metal halide (preferably, in an amount which makes a ratio of alkali metal halide to silver halide be 0.5 to 5) to an electrolyte solution of an optical apparatus. However, in the prior art document, a bistable or memory effect is very short. This is because a counter electrode reaction occurs in addition to metal electrodeposition/dissolving reactions. A product of a strong oxidation reaction generated in a counter electrode enables a metal deposited material on the working electrode to be chemically dissolved on an open circuit or to be electrochemically dissolved on a short circuit.

In describing a concept of a reversible electrodeposition light modulation apparatus, Zaromb (S. Zaromb, J. Electrochem. Soc. 109, p. 903, 1962) recognized that a concentration of an electrodeposition metal should be high enough to rapidly perform rapid electrodeposition without consuming surplus metal ions in an electrode but should be sufficiently lower than a solubility limitation in order to prevent precipitation during a rapid electrolysis period of a metal deposited material. In the case of a Zaromb's apparatus including electrodeposition of a nephelinite Ag deposited material, an aqueous electrolyte containing AgI in a mol concentration range of 3 to 3.5 M (solubility limitation: 4 M) is recommended, and addition of 7 M NaI is recommended in order to improve conductivity of an electrolyte. Nevertheless, electrodeposition metal ions at a relatively low concentration were used in succeeding work on the reversible electrodeposition light modulation apparatus using a water-insoluble solvent. The reason is because, generally, solubility of the ionic salt is significantly low in the water-insoluble solvent having a dielectric constant that is lower than that of water. Further, the ionic salt at a high concentration in the water-insoluble solvent causes meaningful ion pairing, and the ion pairing may reduce conductivity of the electrolyte and reduce a speed at which a deposited material having high quality can be electrodeposited.

The claims of U.S. Pat. No. 5,880,872 by Udaka, et al., describe use of surplus halides added as a Li, Na, or K salt (0.5 times to 5 times a concentration of silver halide) for assisting in dissolving silver halides for an optical apparatus, but the specification describes only dissolving 0.5 M AgBr in a water-insoluble dimethyl sulfoxide (DMSO) solvent. Likewise, U.S. Pat. Nos. 5,764,401 and 5,864,420 by Udaka, et al., describe only use of 0.5 M AgI or AgBr in DMSO and dimethylformamide (DMF) solvents. In the case of an apparatus by Udaka, et al., even an electric potential of 1 V provided only a current of about 1 mA/cm². An apparatus having a mirror deposited material, excellent electrolyte stability, bistability, electrochemical stability, or a long cycle life or switching life-span was not obtained even with any electrolyte preparations by Udaka, et al.

SUMMARY OF THE INVENTION

Accordingly, the present invention has been made in an effort to provide a high efficiency reversible bistable electrochemical mirror which reforms surface physical properties of a transparent electrode by a simple process to secure electrochemical stability so that a metal thin film forming a mirror layer is not stripped from the transparent electrode even though a voltage is continuously applied and to maintain the mirror layer over a long period of time.

An exemplary embodiment of the present invention provides an electrochemical mirror including: a first transparent electrode; a second transparent electrode disposed to be spaced apart from the first transparent electrode; an electrolyte layer positioned between the first transparent electrode and the second transparent electrode and containing metal ions which are capable of being electrodeposited; and a surface-treated layer formed on a surface of the first transparent electrode or the second transparent electrode.

Another exemplary embodiment of the present invention provides an electrochemical mirror having a transistor-type structure, and including: a substrate; a first transparent electrode formed on the substrate; a second transparent electrode disposed to be spaced apart from the first transparent electrode; an electrolyte layer positioned between the first transparent electrode and the second transparent electrode and containing metal ions which are capable of being electrodeposited; a dielectric substance layer formed between the electrolyte layer and the second transparent electrode; and a surface-treated layer formed on a surface of the first transparent electrode or the second transparent electrode.

In the present invention, the surface-treated layer may be formed by treating the surface of the first transparent electrode or the second transparent electrode by oxygen plasma to form a hydroxy group on the surface of the electrode and then reacting the hydroxy group with silane.

In the present invention, silane may be represented by the following Chemical Formula 1.

[Chemical Formula 1]

In the aforementioned Chemical Formula,

R may be a mercapto group, a halogen group, an alkyl group having 1 to 20 carbon atoms, a mercaptoalkyl group having 1 to 20 carbon atoms, a haloalkyl group having 1 to 20 carbon atoms, an aryl group having 1 to 20 carbon atoms, an arylalkyl group having 1 to 20 carbon atoms, an alkylaryl group having 1 to 20 carbon atoms, or an alkoxy group having 1 to 20 carbon atoms.

n may be 0 to 20.

X may be a mercapto group, a halogen group, an alkyl group having 1 to 20 carbon atoms, a mercaptoalkyl group having 1 to 20 carbon atoms, a haloalkyl group having 1 to 20 carbon atoms, an aryl group having 1 to 20 carbon atoms, an arylalkyl group having 1 to 20 carbon atoms, an alkylaryl group having 1 to 20 carbon atoms, or an alkoxy group having 1 to 20 carbon atoms.

In the present invention, the metal ions which are capable of being electrodeposited may be one kind or more selected from silver, gold, magnesium, nickel, bismuth, chromium, copper, calcium, strontium, and aluminum.

In the present invention, the electrolyte layer may include a halogenated salt, and the halogenated salt may be one kind or more selected from tetrabutylammonium bromide (TBABr), tetraethylammonium bromide (TEABr), 1-ethyl-3-methylimidazolium bromide (EMIMBr), 1-methyl-4-hexylimidazolium bromide (MHIMBr), 1-butyl-4-ethylimidazolium bromide (BEIMBr), 1-butyl-4-hexylimidazolium bromide (BHIMBr), 1-butyl-4-dodecylimidazolium bromide (BDIMBr), and 1-benzyl-3-methylimidazolium bromide (BMIMBr).

In the present invention, the electrolyte layer may include one kind or more compounds selected from a copper compound, a calcium compound, and a strontium compound.

In the present invention, the electrolyte layer may include an ionic liquid electrolyte, and the ionic liquid electrolyte may include one kind or more selected from the following Chemical Formulas 2 and 3 as a cation; and one kind or more selected from halogen, a halogen compound, and an imide compound as an anion.

[Chemical Formula 2]

[Chemical Formula 3]

In the aforementioned Chemical Formulas, $R_1$ to $R_5$ may be each independently an alkyl group having 1 to 20 carbon atoms, an aryl group having 1 to 20 carbon atoms, an arylalkyl group having 1 to 20 carbon atoms, or an alkylaryl group having 1 to 20 carbon atoms.

In the present invention, an incident angle of light reflected by a mirror layer formed by electrodeposition of the metal ions may be 0° to 90° that is vertical to the transparent electrode.

A voltage applied to the electrochemical mirror according to the present invention may be less than ±3 V.

Transmittance of the electrochemical mirror according to the present invention to a visible ray region in a transparency state may be 80% or more, and reflectance to the visible ray region and a near-infrared ray region in a mirror state may be 80% or more.

Reflectance of the electrochemical mirror according to the present invention may be maintained even though 1,000 cycles or more of switching is performed, and the electrochemical mirror according to the present invention may have a memory effect where reflectance is maintained even after an applied voltage is removed.

In the present invention, the transparent electrode may be capable of being applied to a glass, polyethylene terephthalate (PET), or flexible substrate.

In the present invention, the electrolyte layer may include an ionic gel-phase electrolyte, and the ionic gel-phase electrolyte may include one kind or more polymers selected from polyvinylidene fluoride (PVDF), poly(vinylidene fluoride-co-hexafluoropropylene) (PVDF-HFP), polyvinylbutyral (PVB), and polyethylene glycol-polypropylene glycol-polyethylene glycol (PEG-PPG-PEG); and an ionic liquid.

According to the present invention, it is possible to manufacture a reversible electrochemical mirror under a low voltage by a surface-treated transparent electrode manufactured by a simple process and an ionic liquid electrolyte composition, and it is possible to use the reversible electrochemical mirror to a smart window applying the window. As compared to the existing reversible mirror, a metal thin film of the electrochemical mirror according to the present invention may be stably maintained even though a voltage is applied over a long period of time, and the reversible electrochemical mirror according to the present invention may have a memory effect where a mirror state is maintained even after the applied voltage is removed, and thus usability as a mirror is increased. Further, since a mirror (reflection) state and a transparency state are implemented by the voltage and bistability is maintained even though electricity is turned off, the reversible electrochemical mirror is useful for an optical device and a display device.

DETAILED DESCRIPTION

Hereinafter, the present invention will be described in detail.

The present invention relates to a switchable electric mirror device including a transparent electrode and an electrolyte and securing electrochemical stability and bistability.

In the present invention, electrochemical stability may mean a property that a metal thin film is stably formed or maintained in application of a voltage over a long period of time and repeated switching. Bistability may mean a property that two states (mirror state and transparency state) are obtained by switching or two stable states are obtained, and particularly, in the present invention, bistability may mean a property that a memory effect where the mirror state and/or the transparency state are maintained even after the applied voltage is removed is achieved.

Figure 2:
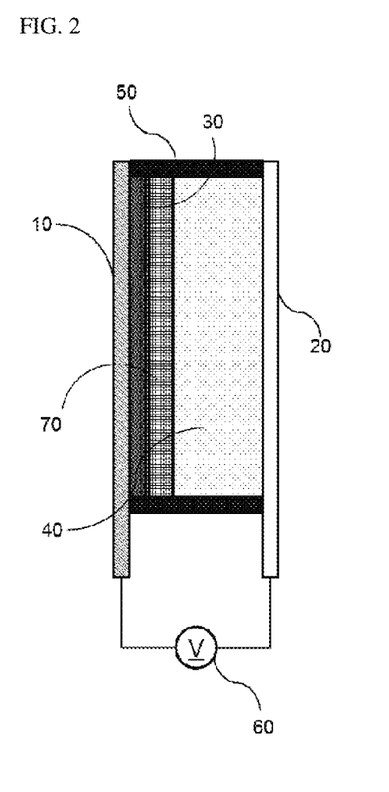
FIG. 2 illustrates that a metal thin film is formed in the switchable electrochemical mirror apparatus according to the exemplary embodiment of the present invention.
Figure 3:
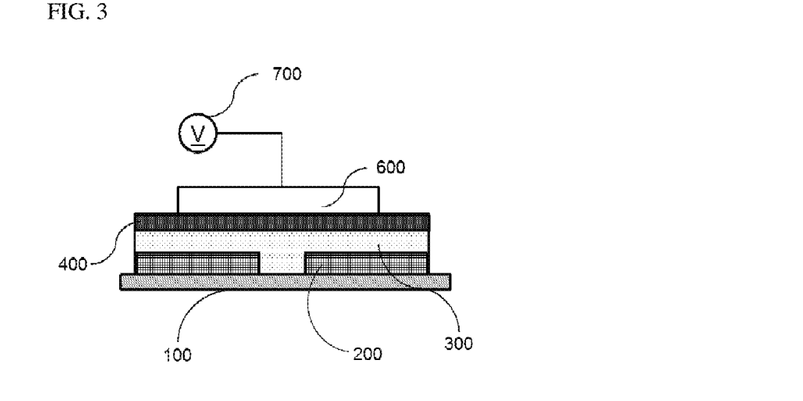
FIG. 3 schematically illustrates a switchable electrochemical mirror apparatus having a transistor-type device structure according to another exemplary embodiment of the present invention.

The electric mirror device according to the present invention can be applied as a device of a structure where a mirror composition (electrolyte) is disposed between two transparent electrodes (FIG. 1 or 2), or a transistor-type structure (FIG. 3).

The reversible electrochemical mirror apparatus according to the present invention may be constituted to include a working transparent electrode in which a mirror layer is formed by reducing a metal cation; an opposite transparent electrode disposed to face the working transparent electrode at a predetermined interval; an electrolyte layer positioned between the two electrodes and containing the metal cation; a surface-treated layer formed on the working transparent electrode; and a power supply electrically connected to the two electrodes to apply a voltage. Further, if necessary, in order to maintain the mirror layer, the reversible electrochemical mirror apparatus may include a conductive polymer thin film formed on one or more of the two electrodes.

An electrochemical mirror according to an exemplary embodiment of the present invention may include a first transparent electrode; a second transparent electrode disposed to be spaced apart from the first transparent electrode; an electrolyte layer positioned between the first transparent electrode and the second transparent electrode and containing metal ions which are capable of being electrodeposited; and a surface-treated layer formed on a surface of the first transparent electrode or the second transparent electrode.

An electrochemical mirror according to another exemplary embodiment of the present invention has a transistor-type structure, and may include a substrate; a first transparent electrode formed on the substrate; a second transparent electrode disposed to be spaced apart from the first transparent electrode; an electrolyte layer positioned between the first transparent electrode and the second transparent electrode and containing metal ions which are capable of being electrodeposited; a dielectric substance layer formed between the electrolyte layer and the second transparent electrode; and a surface-treated layer formed on a surface of the first transparent electrode or the second transparent electrode.

As the transparent electrode, for example, a transparent electrode using indium tin oxide (ITO), fluorine-doped tin oxide, or a carbon nanotube, and the like may be used.

Figure 7:
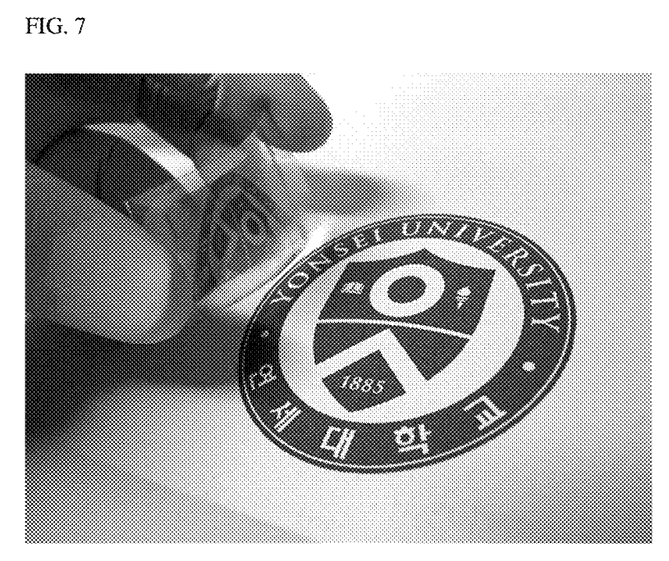
FIG. 7 is a picture illustrating a flexible bistable electrochemical mirror according to the present invention.

The transparent electrode may be formed on the substrate, and as the substrate, a glass substrate, a plastic substrate such as polyethylene terephthalate (PET), a flexible substrate, and the like may be used. FIG. 7 illustrates a flexible bistable electrochemical mirror.

The surface-treated layer may be formed on the first transparent electrode or the second transparent electrode. That is, between the two electrodes, the transparent electrode in which the mirror layer is formed may be preferably surface-treated in order to reform physical properties. A surface-treating method may be oxygen plasma treatment ($O_2$ plasma treatment) and surface functionalization using silane. In the case of surface functionalization using silane, it is easy to convert a process into functionalization adequate for the purpose according to the metal layer by using various silane materials, and particularly, both oxygen plasma treatment and silane surface functionalization are a very simple process.

Specifically, the surface-treated layer may be formed by treating the surface of the first transparent electrode or the second transparent electrode by oxygen plasma to form a hydroxy group on the surface of the electrode and then reacting the hydroxy group with silane. By forming the surface-treated transparent electrode through oxygen plasma treatment, a surface reaction with silane, and the like, the transparent electrode and the formed metal thin film (mirror layer) are prevented from being stripped through high chemical affinity with the metal thin film, and thus high stability may be secured.

A matter represented by the following Chemical Formula 1 may be used as silane, and silane can be easily surface-treated by a chemical method.

R—(CH$_2$)$_n$—Si—X$_3$         [Chemical Formula 1]

In the aforementioned Chemical Formula,

R may be all functional groups that can improve stability of the thin film so that the metal thin film is not stripped, and for example, may be a mercapto group, a halogen group, an alkyl group having 1 to 20 carbon atoms, a mercaptoalkyl group having 1 to 20 carbon atoms, a haloalkyl group having 1 to 20 carbon atoms, an aryl group having 1 to 20 carbon atoms, an arylalkyl group having 1 to 20 carbon atoms, an alkylaryl group having 1 to 20 carbon atoms, or an alkoxy group having 1 to 20 carbon atoms. Further, R may include, in addition to carbon, other elements such as oxygen, sulfur, and halogen elements.

n may be an integer of 0 or 1 to 20.

X may be applied to all functional groups that can be hydrolyzed, and for example, may be a mercapto group, a halogen group, an alkyl group having 1 to 20 carbon atoms, a mercaptoalkyl group having 1 to 20 carbon atoms, a haloalkyl group having 1 to 20 carbon atoms, an aryl group having 1 to 20 carbon atoms, an arylalkyl group having 1 to 20 carbon atoms, an alkylaryl group having 1 to 20 carbon atoms, or an alkoxy group having 1 to 20 carbon atoms. Further, X may include, in addition to carbon, other elements such as oxygen, sulfur, and halogen elements.

For example, silane represented by Chemical Formula 1 may be (3-mercaptopropyl)trimethoxysilane or (3,3,3-trifluoropropyl)trimethoxysilane, or a mixture thereof.

The electrolyte layer may include at least one kind of metal ions that can be electrodeposited, an additive for standardization (uniformization, planarization) of a mirror phase, a brominated salt, a solvent, an ionic liquid electrolyte, a lattice polymer, other additives, and the like. For example, as a constitution of the electrolyte layer, a combination of a metal compound that can be electrodeposited, an additive for standardization of a mirror phase, a brominated salt, a lattice polymer, and a solvent (Example 1); a combination of a metal compound that can be electrodeposited, an additive for standardization of a mirror phase, a brominated salt, a lattice polymer, and an ionic liquid electrolyte (Examples 2 and 3); a combination of a metal compound that can be electrodeposited, an additive for standardization of a mirror phase, a brominated salt, and an ionic liquid electrolyte (Examples 4, 9, 10, and 12); a combination of a metal compound that can be electrodeposited, an additive for standardization of a mirror phase, and an ionic liquid electrolyte (Examples 5 to 8); and a combination of a metal compound that can be electrodeposited, an additive for standardization of a mirror phase, an ionic liquid electrolyte, and a lattice polymer (Example 11) are feasible. The electrolyte layer may be formed in a liquid phase or a gel phase.

The metal ions that can be electrodeposited on the transparent electrode may be a metal having high reflectance to all white light, for example, one kind or more selected from silver, gold, magnesium, nickel, bismuth, chromium, copper, calcium, strontium, and aluminum. The metal ions may be included in a form of nitrates, sulfates, chlorides, or the like in the electrolyte, and may form the mirror layer on the working transparent electrode by reduction. A concentration of the metal compound may be, for example, 1 to 500 mM, preferably 10 to 100 mM, and more preferably 30 to 70 mM.

The additive for standardized formation of the mirror phase may be one kind or more compounds selected from a copper compound, a calcium compound, and a strontium compound. The compounds may be included in a form of chlorides, nitrates, sulfates, or the like in the electrolyte, and may be added with a content of less than 50 wt % to form an electric alloy with the metal compound that can be electrodeposited. A concentration of the additive may be, for example, 0.1 to 100 mM, preferably 1 to 50 mM, and more preferably 5 to 20 mM.

A halogenated salt may be one kind or more selected from tetrabutylammonium bromide (TBABr), tetraethylammonium bromide (TEABr), 1-ethyl-3-methylimidazolium bromide (EMIMBr), 1-methyl-4-hexylimidazolium bromide (MHIMBr), 1-butyl-4-ethylimidazolium bromide (BEIMBr), 1-butyl-4-hexylimidazolium bromide (BHIMBr), 1-butyl-4-dodecylimidazolium bromide (BDIMBr), and 1-benzyl-3-methylimidazolium bromide (BMIMBr). A concentration of the halogenated salt may be, for example, 10 to 1000 mM, preferably 100 to 500 mM, and more preferably 200 to 300 mM.

The ionic liquid electrolyte may include one kind or more selected from the following Chemical Formulas 2 and 3 as a cation; and one kind or more selected from halogen, a halogen compound, and an imide compound as an anion.

[Chemical Formula 2]

[Chemical Formula 3]

In the aforementioned Chemical Formulas, $R_1$ to $R_5$ may be each independently an alkyl group having 1 to 20 carbon atoms, an aryl group having 1 to 20 carbon atoms, an arylalkyl group having 1 to 20 carbon atoms, or an alkylaryl group having 1 to 20 carbon atoms.

With respect to the anion of the ionic liquid electrolyte, anions having various sizes are feasible, and for example, a halogen element (Br and the like), a halogen-containing imide compound, and the like are feasible. In the case where the ionic liquid electrolyte including the halogen element as the anion is used, since the halogen element is included in the ionic liquid electrolyte, a separate halogenated salt may not be used. That is, like the case of Examples 5 to 8, the halogenated salt may not be used, and only the ionic liquid electrolyte including the halogen element as the anion may be used.

The electrolyte layer may include an additive for increasing stability and a switching speed. Particularly, in order to increase stability of the electrolyte layer, an ionic gel-phase electrolyte including the lattice polymer and an ionic liquid may be used.

As the lattice polymer, one kind or more selected from polyvinylidene fluoride (PVDF), poly(vinylidene fluoride-co-hexafluoropropylene) (PVDF-HFP), polyvinylbutyral (PVB), and polyethylene glycol-polypropylene glycol-polyethylene glycol (PEG-PPG-PEG) may be used. A concentration of the lattice polymer may be 1 to 50 wt %, preferably 3 to 30 wt %, and more preferably 5 to 20 wt %.

In the present invention, the electrochemical mirror device is constituted by the transparent electrode, the surface-treated layer, and the electrolyte layer in a state where a voltage is not applied (FIG. 1), and usually, can be used as a transparent window having high transmittance. In the case where the voltage is applied, reduction of the metal cations may occur on the surface-treated working transparent electrode to form the mirror phase (FIG. 2), thereby maximize resolution of the mirror phase, and providing an excellent blocking property.

As described above, in the case where the voltage is not applied, both the electrode and the electrolyte layer of the electrochemical mirror according to the present invention may show a transparent property. Further, in the case where the voltage is applied, the mirror layer having high reflectance is formed on the surface-treated working transparent electrode, and the formed mirror layer may not be stripped even though the voltage is continuously applied by chemical interference with the surface-treated electrode.

An incident angle of light reflected by the formed mirror layer may be 0° to 90° that is vertical to the electrode. Further, the voltage applied to the reversible electrochemical mirror by the power source portion may be less than ±3 V, that is, the electrochemical mirror according to the present invention can be driven at a low voltage.

Figure 8:
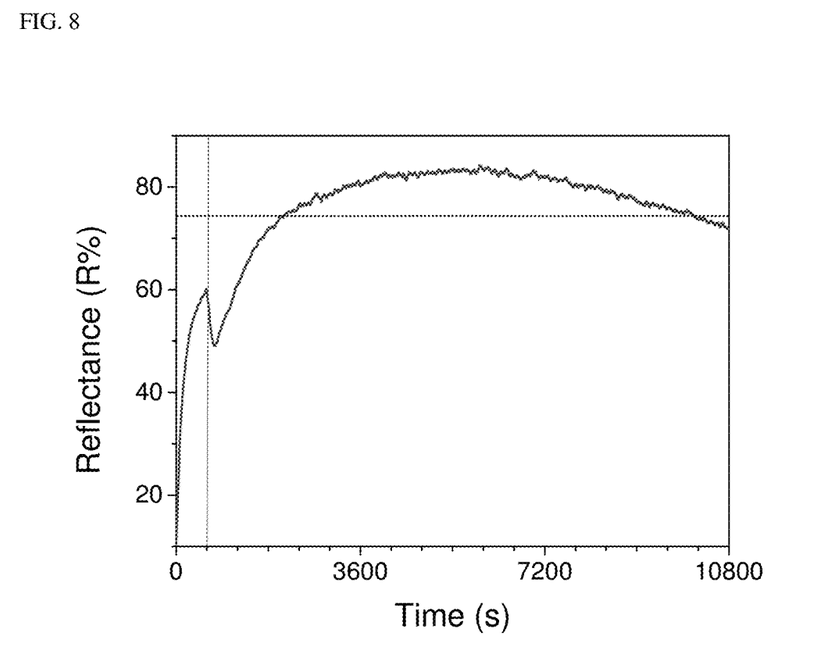
FIGS. 8 and 9 are a graph of bistability of the electrochemical mirror according to the present invention and a picture thereof according to a time.
Figure 9:
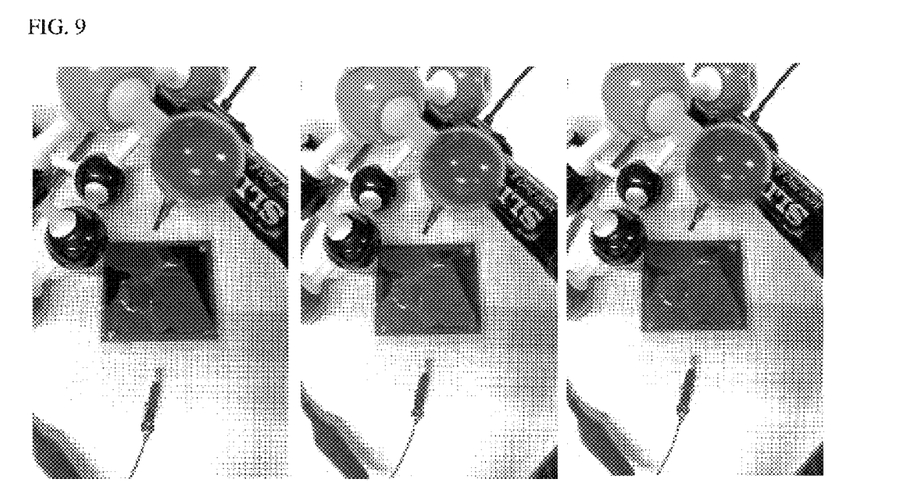
Figure 10:
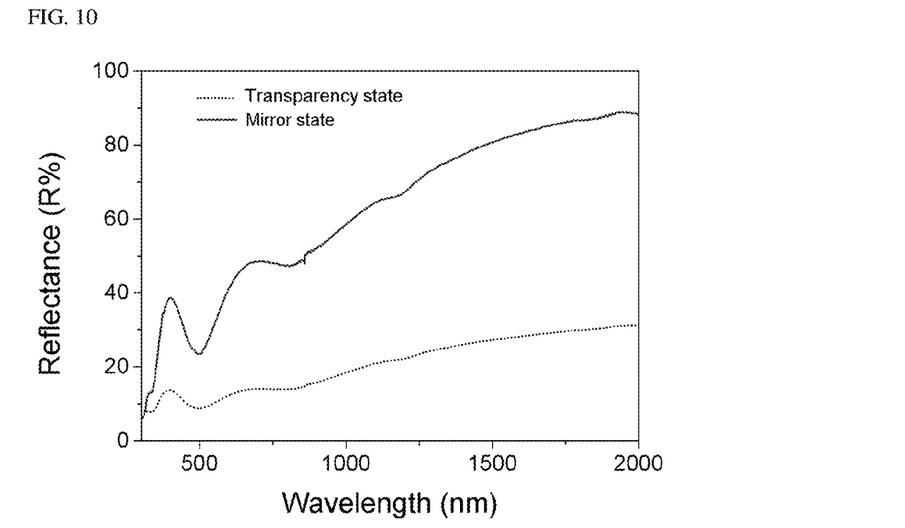
FIG. 10 is a graph illustrating reflectance of the switchable electrochemical mirror apparatus according to the present invention.

In the transparency state of the electrochemical mirror device according to the present invention, the electrochemical mirror device may have high transmittance to a visible ray, and in the mirror state, the electrochemical mirror device may have high reflectance. A range of high reflectance may include a visible ray region and may include not only a visible ray region but also a near-infrared ray region, which is illustrated in FIGS. 8 to 10. Specifically, transmittance of the electrochemical mirror according to the present invention to the visible ray region in the transparency state may be 80% or more, and reflectance to the visible ray region and the near-infrared ray region in the mirror state may be 80% or more.

Reflectance of the electrochemical mirror according to the present invention may be maintained even though 1,000 cycles or more of switching is performed at a predetermined interval, and the electrochemical mirror according to the present invention may have a memory effect where reflectance is maintained even after an applied voltage is removed.

Hereinafter, the present invention will be described in detail with reference to the accompanying drawings.

Figure 1:
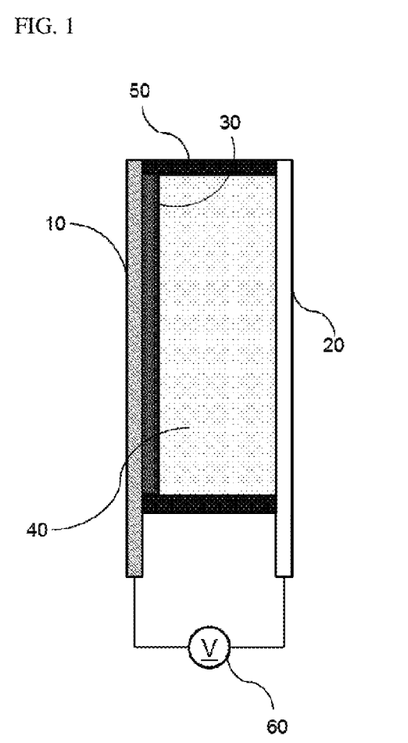
FIG. 1 schematically illustrates a switchable electrochemical mirror apparatus according to an exemplary embodiment of the present invention.

FIG. 1 illustrates a schematic constitution of the reversible electrochemical mirror apparatus according to the exemplary embodiment of the present invention. In order to effectively illustrate the structure and the function of the present invention, dimensions including the thickness of the thin film may not be proportional to the drawings.

The reversible electrochemical mirror apparatus according to FIG. 1 may include a first transparent electrode 10 serving as a working electrode, a second transparent electrode 20 disposed be spaced apart from the first transparent electrode 10 so as to face the first transparent electrode 10 and serving as a counter electrode, a surface-treated layer 30 formed on the first transparent electrode 10 that is the working electrode, an electrolyte layer 40 including metal cations, a spacer 50 sealing the electrolyte layer 40, and a power source portion 60 applying a voltage to each of the transparent electrodes 10 and 20. As the spacer 50, a polyimide tape and the like may be used.

The apparatus in the case where the voltage is not applied may be illustrated in FIG. 1. In FIG. 1, since all of the first transparent electrode 10, the second transparent electrode 20, the surface-treated layer 30, and the electrolyte layer 40 existing on a path through which incident light that is incident from a light source passes have high transmittance to the visible ray, the entire apparatus transmits the visible ray.

As illustrated in FIG. 2, if the voltage is applied, an electrochemical reduction reaction occurs on the first transparent electrode 10, and the metal cations contained in the electrolyte layer 40 coming into contact with the surface of the first transparent electrode 10 are reduced into a metal thin film 70 that is the mirror layer (mirror phase) on the surface of the first transparent electrode 10.

The metal constituting the mirror metal thin film 70 may include silver, gold, nickel, and magnesium having indiscriminately high reflectance to the visible ray, and a small amount of copper, calcium, and strontium helping to form electric alloys in order to form the uniform metal thin film.

Particularly, a stripping phenomenon of the first transparent electrode 10 and the metal thin film 70 may be minimized through the surface-treated layer 30. Through oxygen plasma treatment, a surface reaction with silane, and the like as a surface-treating method, the surface-treated layer may be formed on the surface of the transparent electrode so that the surface-treated layer has high chemical affinity with the metal thin film, thereby preventing the formed metal thin film 70 from being stripped and thus securing high stability.

FIG. 3 schematically illustrates a switchable electrochemical mirror apparatus having a transistor-type device structure according to another exemplary embodiment of the present invention, and the electrochemical mirror apparatus may be constituted by a substrate 100, a first transparent electrode 200, an electrolyte layer 300, a dielectric substance layer 400, a second transparent electrode 600, and a power source portion 700, and can be used as a device that may form the metal thin film like FIG. 1 that is a sandwich-type device having a simple structure. A surface-treated layer may be formed on any one of the transparent electrodes 200 and 600. The substrate 100 may be a transparent substrate, and may be formed of glass, PET, or the like. A general dielectric substance such as a polymer and metal oxides may be used as the dielectric substance.

Figure 4:
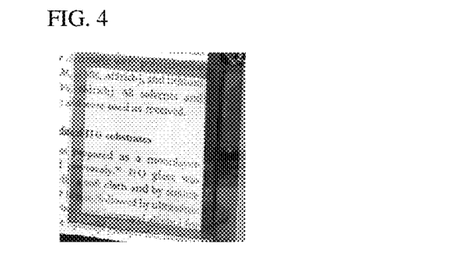
FIG. 4 is a picture illustrating a transparency state of the switchable electrochemical mirror apparatus according to the present invention.

FIG. 4 is a picture illustrating the transparency state of the switchable electrochemical mirror apparatus according to the present invention, and it can be confirmed that letters behind the mirror apparatus are seen because of the transparency state having high transmittance.

Figure 5:
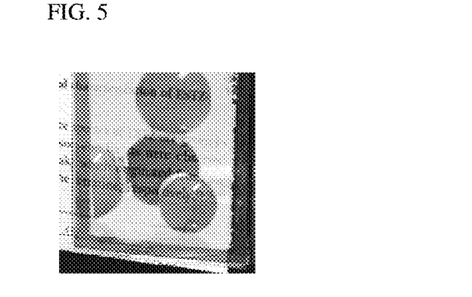
FIG. 5 is a picture illustrating a mirror state of the switchable electrochemical mirror apparatus according to the present invention.

FIG. 5 is a picture illustrating the mirror state of the switchable electrochemical mirror apparatus according to the present invention, and it can be confirmed that letters behind the mirror apparatus are not seen but figures and letters ahead of the mirror apparatus are reflected to be seen because of the mirror state having high reflectance.

Figure 6:
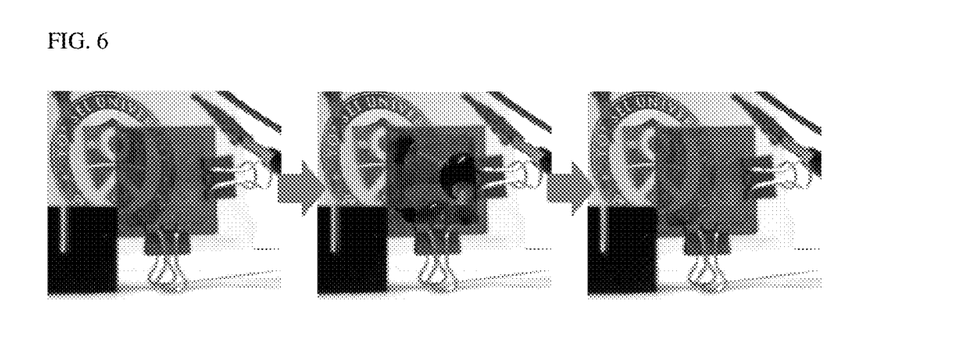
FIG. 6 is a picture illustrating switching of a bistable electrochemical mirror apparatus according to the present invention.

FIG. 6 is a picture illustrating switching of the bistable electrochemical mirror apparatus according to the present invention, and it can be confirmed that the mirror state and the transparency state are repeated according to switching.

FIG. 7 is a picture illustrating a flexible bistable electrochemical mirror according to the present invention, and it can be confirmed that the mirror is easily bent by force using a hand.

FIGS. 8 and 9 are a graph of bistability of the electrochemical mirror according to the present invention and a picture thereof according to a time, and it can be confirmed that the reflectance and the reflection state are continuously maintained even after power supply is turned off. In FIG. 9, a first picture shows 1 minute after power supply is turned off, a second picture shows 5 minute after power supply is turned off, and a third picture shows 10 minute after power supply is turned off.

FIG. 10 is a graph illustrating reflectances in the transparency state and the mirror state of the switchable electrochemical mirror apparatus according to the present invention, it can be confirmed that reflectances in the transparency state and the mirror state are significantly different from each other, and it can be confirmed that reflectance is increased as a wavelength is increased, and thus reflectance is high in a near-infrared ray wavelength region.

Hereinafter, the present invention will be described in more detail with reference to Examples.

The reagents and the solvents used in the following Examples were purchased from Aldrich Corporation (U.S.A), TCI (Japan), and Acros (Belgium) to be used unless particularly mentioned.

Physical properties of the electrochemical mirror manufactured in the Examples were measured by using CH Instruments CHI 624 and Perkin Elmer UV-Vis-NIR spectrometer.

Example 1

In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3-mercaptopropyl)trimethoxysilane, and surface-treated so as to react (3-mercaptopropyl)trimethoxysilane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the DMSO (dimethyl sulfoxide) solution containing silver nitrate ($AgNO_3$, 50 mM), copper chloride ($CuCl_2$, 10 mM), TBABr (250 mM), and 10 mass % of PVB as the lattice polymer was then injected to manufacture the mirror device that could reflect the infrared rays and the visible rays. With respect to the manufactured mirror device, switching was performed by using electricity of 2.5 V, and as a result of switching, reflectance of about 90% was exhibited. Further, when switching was repeatedly performed, the time for which reflectance was maintained and the number of times of switching in which reflectance was maintained were measured, and as a result of switching, electrochemical stability of 30 minutes or more and about 5000 times switching was exhibited.

Example 2

In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3-mercaptopropyl)trimethoxysilane, and surface-treated so as to react (3-mercaptopropyl)trimethoxysilane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the solution containing $AgNO_3$ (50 mM), $CuCl_2$ (10 mM), TBABr (250 mM), and 10 mass % of PEG-PPG-PEG as the lattice polymer and having the EMIMTFSI ionic liquid as the solvent was then injected to manufacture the mirror device that could reflect the infrared rays and the visible rays. With respect to the manufactured mirror device, switching was performed by using electricity of 2.5 V, and as a result of switching, reflectance of about 80% was exhibited. Further, when switching was repeatedly performed, the time for which reflectance was maintained and the number of times of switching in which reflectance was maintained were measured, and as a result of switching, electrochemical stability of 30 minutes or more and about 5000 times switching was exhibited.

Example 3

In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3-mercaptopropyl)trimethoxysilane, and surface-treated so as to react (3-mercaptopropyl)trimethoxysilane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the solution containing $AgNO_3$ (50 mM), $CuCl_2$ (10 mM), EMIMBr (250 mM), and 10 mass % of PEG-PPG-PEG as the lattice polymer and having the EMIMTFSI ionic liquid as the solvent was then injected to manufacture the mirror device that could reflect the infrared rays and the visible rays. With respect to the manufactured mirror device, switching was performed by using electricity of 2.5 V, and as a result of switching, reflectance of about 80% was exhibited. Further, when switching was repeatedly performed, the time for which reflectance was maintained and the number of times of switching in which reflectance was maintained were measured, and as a result of switching, electrochemical stability of 30 minutes or more and about 5000 times switching was exhibited. Further, the time for which reflectance was maintained even after the applied voltage was removed was measured, and as a result of switching, improved bistability of 10 minutes or more was exhibited.

Example 4

In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3-mercaptopropyl)trimethoxysilane, and surface-treated so as to react (3-mercaptopropyl)trimethoxysilane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the solution containing $AgNO_3$ (50 mM), $CuCl_2$ (10 mM), and EMIMBr (250 mM) and having the EMIMTFSI ionic liquid as the solvent was then injected to manufacture the mirror device that could reflect the infrared rays and the visible rays. With respect to the manufactured mirror device, switching was performed by using electricity of 2.5 V, and as a result of switching, reflectance of about 80% was exhibited. Further, when switching was repeatedly performed, the time for which reflectance was maintained and the number of times of switching in which reflectance was maintained were measured, and as a result of switching, electrochemical stability of 30 minutes or more and about 5000 times switching was exhibited. Further, the time for which reflectance was maintained even after the applied voltage was removed was measured, and as a result of switching, improved bistability of 10 minutes or more was exhibited.

Example 5

1 mol of methyl imidazole (1-methyl imidazole) and 1 mol of bromohexane (n-bromohexane) were agitated under nitrogen atmosphere at 80° C. for 24 hours to obtain the MHIMBr ionic liquid. In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3-mercaptopropyl)trimethoxysilane, and surface-treated so as to react (3-mercaptopropyl)trimethoxysilane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the solution containing $AgNO_3$ (50 mM) and $CuCl_2$ (10 mM) and having the MHIMBr ionic liquid as the solvent was then injected to manufacture the mirror device that could reflect the infrared rays and the visible rays. With respect to the manufactured mirror device, switching was performed by using electricity of 2.5 V, and as a result of switching, reflectance of about 80% was exhibited. Further, when switching was repeatedly performed, the time for which reflectance was maintained and the number of times of switching in which reflectance was maintained were measured, and as a result of switching, electrochemical stability of 10 minutes or more and about 5000 times switching was exhibited. Further, the time for which reflectance was maintained even after the applied voltage was removed was measured, and as a result of switching, improved bistability of 3 hours or more was exhibited.

Example 6

1 mol of butyl imidazole (1-butyl imidazole) and 1 mol of bromoethane were agitated under nitrogen atmosphere at 50° C. for 24 hours to obtain the BEIMBr ionic liquid. In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3-mercaptopropyl)trimethoxysilane, and surface-treated so as to react (3-mercaptopropyl)trimethoxysilane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the solution containing $AgNO_3$ (50 mM) and $CuCl_2$ (10 mM) and having the BEIMBr ionic liquid as the solvent was then injected to manufacture the mirror device that could reflect the infrared rays and the visible rays. With respect to the manufactured mirror device, switching was performed by using electricity of 2.5 V, and as a result of switching, reflectance of about 90% was exhibited. Further, when switching was repeatedly performed, the time for which reflectance was maintained and the number of times of switching in which reflectance was maintained were measured, and as a result of switching, electrochemical stability of 10 minutes or more and about 5000 times switching was exhibited. Further, the time for which reflectance was maintained even after the applied voltage was removed was measured, and as a result of switching, improved bistability of 3 hours or more was exhibited.

Example 7

1 mol of butyl imidazole and 1 mol of bromohexane were agitated under nitrogen atmosphere at 80° C. for 24 hours to obtain the BHIMBr ionic liquid. In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3,3,3-trifluoropropyl)trimethoxysilane, and surface-treated so as to react (3,3,3-trifluoropropyl)trimethoxysilane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the solution containing $AgNO_3$ (50 mM) and $CuCl_2$ (10 mM) and having the BHIMBr ionic liquid as the solvent was then injected to manufacture the mirror device that could reflect the infrared rays and the visible rays. With respect to the manufactured mirror device, switching was performed by using electricity of 2.5 V, and as a result of switching, reflectance of about 50% was exhibited. Further, when switching was repeatedly performed, the time for which reflectance was maintained and the number of times of switching in which reflectance was maintained were measured, and as a result of switching, electrochemical stability of 10 minutes or more and about 5000 times switching was exhibited. Further, the time for which reflectance was maintained even after the applied voltage was removed was measured, and as a result of switching, improved bistability of 3 hours or more was exhibited.

Example 8

1 mol of butyl imidazole and 1 mol of bromododecane (n-bromododecane) were agitated under nitrogen atmosphere at 80° C. for 24 hours to obtain the BDIMBr ionic liquid. In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3,3,3-trifluoropropyl)trimethoxysilane, and surface-treated so as to react (3,3,3-trifluoropropyl)trimethoxysilane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the solution containing magnesium nitrate (Mg$(NO_3)_3$, 50 mM) and $CuCl_2$ (10 mM) and having the BDIMBr ionic liquid as the solvent was then injected to manufacture the mirror device that could reflect the infrared rays and the visible rays. With respect to the manufactured mirror device, switching was performed by using electricity of 2.5 V, and as a result of switching, reflectance of about 30% was exhibited. Further, when switching was repeatedly performed, the time for which reflectance was maintained and the number of times of switching in which reflectance was maintained were measured, and as a result of switching, electrochemical stability of 10 minutes or more and about 5000 times switching was exhibited. Further, the time for which reflectance was maintained even after the applied voltage was removed was measured, and as a result of switching, improved bistability of 3 hours or more was exhibited.

Example 9

After 1,2,4-triazole (75 mL, 144.6 mmol) was dissolved in methanol (75 mL), $NaOCH_3$ (33.1 mL, 25 wt %, methanol solution) was added under nitrogen atmosphere at 0° C., followed by agitation at 60° C. for 2 hours, $CH_3I$ (10.1 mL) was slowly added and agitated at 70° C. for 1 hour, extraction was performed by using benzene and chloroform, and 4-methyl-1-H,2-H,triazole obtained by distillation at 125° C. and $CH_3CH_2Cl$ (equivalent) were agitated at 60° C. for 24 hours and then precipitated in ethyl ether to manufacture METTFSI. In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of the mixture including (3-mercaptopropyl)trimethoxysilane and (3,3,3-trifluoropropyl)trimethoxysilane at the ratio of 1:1, and surface-treated so as to react silane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the solution containing $AgNO_3$ (50 mM), $CuCl_2$ (10 mM), and EMIMBr (250 mM) and having the METTFSI ionic liquid synthesized by the aforementioned method as the solvent was then injected to manufacture the mirror device that could reflect the infrared rays and the visible rays. With respect to the manufactured mirror device, switching was performed by using electricity of 2.5 V, and as a result of switching, reflectance of about 80% was exhibited. Further, when switching was repeatedly performed, the time for which reflectance was maintained and the number of times of switching in which reflectance was maintained were measured, and as a result of switching, electrochemical stability of 10 minutes or more and about 5000 times switching was exhibited. Further, the time for which reflectance was maintained even after the applied voltage was removed was measured, and as a result of switching, improved bistability of 30 minutes or more was exhibited.

Example 10

In order to form the hydroxy group on the surface of the transparent electrode of the ITO PET film having the width of 3 cm and the length of 4 cm or more, after oxygen plasma treatment was performed for about 5 minutes, the transparent electrode was added to the vacuum chamber together with the small amount of (3-mercaptopropyl)trimethoxysilane, and surface-treated so as to react (3-mercaptopropyl)trimethoxysilane with the surface of the transparent electrode, thus preventing the stripping phenomenon of the metal reflection thin film. Another ITO transparent electrode was used as the counter electrode of the surface-treated electrode, the interval was secured by the polyimide tape having the height of 0.5 mm so as to introduce the electrolyte between the two electrodes, and the solution containing $AgNO_3$ (50 mM), $CuCl_2$ (10 mM), and EMIMBr (250 mM) and having the EMIMTFSI ionic liquid as the solvent was then injected to manufacture the flexible mirror device that could reflect the infrared rays and the visible rays. With respect to the manufactured mirror device, switching was performed by using electricity of 2.5 V, and as a result of switching, reflectance of about 50% was exhibited. Further, when switching was repeatedly performed, the time for which reflectance was maintained and the number of times of switching in which reflectance was maintained were measured, and as a result of switching, electrochemical stability of 30 minutes or more and about 5000 times switching was exhibited. Further, the time for which reflectance was maintained even after the

Example 11

In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3-mercaptopropyl)trimethoxysilane, and surface-treated so as to react (3-mercaptopropyl)trimethoxysilane with the surface of the transparent electrode, thus preventing the stripping phenomenon of the metal reflection thin film. Another ITO transparent electrode was used as the counter electrode of the surface-treated electrode, and the ionic gel-phase electrolyte obtained by dissolving the BEIMBr ionic liquid solution containing $AgNO_3$ (50 mM) and $CuCl_2$ (10 mM) and PVDF-HFP at the ratio of 1:1 in acetone and then vaporizing acetone was used between the two electrodes to manufacture the mirror device that could reflect the infrared rays and the visible rays. With respect to the manufactured mirror device, switching was performed by using electricity of 2.5 V, and as a result of switching, reflectance of about 30% was exhibited. Further, when switching was repeatedly performed, the time for which reflectance was maintained and the number of times of switching in which reflectance was maintained were measured, and as a result of switching, electrochemical stability of 1 hour or more and about 5000 times switching was exhibited. Further, the time for which reflectance was maintained even after the applied voltage was removed was measured, and as a result of switching, improved bistability of 30 minutes or more was exhibited.

Example 12

In order to form the hydroxy group on the surface of the ITO transparent electrode having the width of 3 cm and the length of 4 cm or more, after oxygen plasma treatment was performed for about 5 minutes, the ITO transparent electrode was added to the vacuum chamber together with the small amount of (3-mercaptopropyl)trimethoxysilane, and surface-treated so as to react (3-mercaptopropyl)trimethoxysilane with the surface of the transparent electrode, thus preventing the stripping phenomenon of the metal reflection thin film. Another ITO transparent electrode was used as the counter electrode of the surface-treated electrode, and the solution containing chromium nitrate ($Cr(NO_3)_3$, 50 mM), $CuCl_2$ (10 mM), and BMIMBr (250 mM) and having the EMIMTFSI ionic liquid as the solvent was injected between the two electrodes to manufacture the mirror device that could reflect the infrared rays and the visible rays. With respect to the manufactured mirror device, switching was performed by using electricity of 2.5 V, and as a result of switching, reflectance of about 50% was exhibited. Further, when switching was repeatedly performed, the time for which reflectance was maintained and the number of times of switching in which reflectance was maintained were measured, and as a result of switching, electrochemical stability of 1 hour or more and about 5000 times switching was exhibited. Further, the time for which reflectance was maintained even after the applied voltage was removed was measured, and as a result of switching, improved bistability of 30 minutes or more was exhibited.

Table 1 arranges compositions and physical properties of the electrolytes of the Examples.

TABLE 1

| Example | Added ingredient 1 (brominated salt) | Added ingredient 2 (lattice polymer) | Added ingredient 3 (solvent) | Maximum reflectance | Electro-chemical stability | Bistability (after switching for 30 minutes) | Kind of transparent electrode |
|---|---|---|---|---|---|---|---|
| 1 | TBABr | PVB | DMSO | 90% | 30 minutes or more | 3 minutes or more | Surface-treated ITO glass |
| 2 | TBABr | PEG-PPG-PEG | EMIMTFSI | 80% | 30 minutes or more | 3 minutes or more | Surface-treated ITO glass |
| 3 | EMIMBr | PEG-PPG-PEG | EMIMTFSI | 80% | 30 minutes or more | 10 minutes or more | Surface-treated ITO glass |
| 4 | EMIMBr | — | EMIMTFSI | 80% | 30 minutes or more | 10 minutes or more | Surface-treated ITO glass |
| 5 | — | — | MHIMBr | 80% | 10 minutes or more | 3 hours or more | Surface-treated ITO glass |
| 6 | — | — | BEIMBr | 90% | 10 minutes or more | 3 hours or more | Surface-treated ITO glass |
| 7 | — | — | BHIMBr | 50% | 10 minutes or more | 3 hours or more | Surface-treated ITO glass |
| 8 | — | — | BDIMBr | 30% | 10 minutes or more | 3 hours or more | Surface-treated ITO glass |
| 9 | EMIMBr | — | METTFSI | 80% | 10 minutes or more | 30 minutes or more | Surface-treated ITO glass |
| 10 | EMIMBr | — | EMIMTFSI | 50% | 30 minutes or more | 10 minutes or more | Surface-treated PET film |

TABLE 1-continued

| Example | Added ingredient 1 (brominated salt) | Added ingredient 2 (lattice polymer) | Added ingredient 3 (solvent) | Maximum reflectance | Electro-chemical stability | Bistability (after switching for 30 minutes) | Kind of transparent electrode |
|---|---|---|---|---|---|---|---|
| 11 | — | PVDF-HFP | BEIMBr | 30% | 1 hour or more | 30 minutes or more | Surface-treated ITO glass |
| 12 | BMIMBr | — | EMIMTFSI | 50% | 1 hour or more | 30 minutes or more | Surface-treated ITO glass |

What is claimed is:

1. An electrochemical mirror comprising:
a first transparent electrode;
a second transparent electrode disposed to be spaced apart from the first transparent electrode;
an electrolyte layer positioned between the first transparent electrode and the second transparent electrode and containing metal ions which are capable of being electrodeposited; and
a surface-treated layer formed on a surface of the first transparent electrode or the second transparent electrode,
wherein the surface-treated layer is formed by treating the surface of the first transparent electrode or the second transparent electrode by oxygen plasma to form a hydroxy group on the surface of the electrode and then reacting the hydroxy group with silane,
wherein the silane is represented by the following Chemical Formula 1:

$$R\text{—}(CH_2)_n\text{—}Si\text{—}X_3 \quad \text{[Chemical Formula 1]}$$

in the aforementioned Chemical Formula,
R is a mercapto group, a halogen group, an alkyl group having 1 to 20 carbon atoms, a mercaptoalkyl group having 1 to 20 carbon atoms, a haloalkyl group having 1 to 20 carbon atoms, an aryl group having 1 to 20 carbon atoms, an arylalkyl group having 1 to 20 carbon atoms, an alkylaryl group having 1 to 20 carbon atoms, or an alkoxy group having 1 to 20 carbon atoms,
n is 0 to 20, and
X is a mercapto group, a halogen group, an alkyl group having 1 to 20 carbon atoms, a mercaptoalkyl group having 1 to 20 carbon atoms, a haloalkyl group having 1 to 20 carbon atoms, an aryl group having 1 to 20 carbon atoms, 1 group having 1 to 20 carbon atoms, an alkylaryl group having 1 to 20 carbon atoms, or an alkoxy group having 1 to 20 carbon atoms.

2. The electrochemical mirror of claim 1, wherein the electrochemical mirror has a transistor-type structure, and comprises:
a substrate;
a first transparent electrode formed on the substrate;
a second transparent electrode disposed to be spaced apart from the first transparent electrode;
an electrolyte layer positioned between the first transparent electrode and the second transparent electrode and containing metal ions which are capable of being electrodeposited;
a dielectric substance layer formed between the electrolyte layer and the second transparent electrode; and
a surface-treated layer formed on a surface of the first transparent electrode or the second transparent electrode.

3. The electrochemical mirror of claim 1, wherein the metal ions which are capable of being electrodeposited are one kind or more selected from silver, gold, magnesium, nickel, bismuth, chromium, copper, calcium, strontium, and aluminum.

4. The electrochemical mirror of claim 1, wherein the electrolyte layer includes a halogenated salt.

5. The electrochemical mirror of claim 4, wherein the halogenated salt is one kind or more selected from tetrabutylammonium bromide (TBABr), tetraethylammonium bromide (TEABr), 1-ethyl-3-methylimidazolium bromide (EMIMBr), 1-methyl-4-hexylimidazolium bromide (MHIMBr), 1-butyl-4-ethylimidazolium bromide (BEIMBr), 1-butyl-4-hexylimidazolium bromide (BHIMBr), 1-butyl-4-dodecylimidazolium bromide (BDIMBr), and 1-benzyl-3-methylimidazolium bromide (BMIMBr).

6. The electrochemical mirror of claim 1, wherein the electrolyte layer includes one kind or more compounds selected from a copper compound, a calcium compound, and a strontium compound.

7. The electrochemical mirror of claim 1, wherein the electrolyte layer includes an ionic liquid electrolyte.

8. The electrochemical mirror of claim 7, wherein the ionic liquid electrolyte includes one kind or more selected from the following Chemical Formulas 2 and 3 as a cation; and one kind or more selected from halogen, a halogen compound, and an imide compound as an anion:

[Chemical Formula 2]

[Chemical Formula 3]

in the aforementioned Chemical Formulas, $R_1$ to $R_5$ are each independently an alkyl group having 1 to 20 carbon atoms, an aryl group having 1 to 20 carbon atoms, an arylalkyl group having 1 to 20 carbon atoms, or an alkylaryl group having 1 to 20 carbon atoms.

9. The electrochemical mirror of claim 1, wherein an incident angle of light reflected, by a mirror layer formed by electrodeposition of the metal ions is 0° to 90° that is vertical to the transparent electrode.

10. The electrochemical mirror of claim 1, wherein a voltage applied to the electrochemical mirror is less than ±3 V.

11. The electrochemical mirror of claim 1, wherein transmittance of the electrochemical mirror to a visible ray region in a transparency state is 80% or more, and reflectance to the visible ray region and a near-infrared ray region in a mirror state is 80% or more.

12. The electrochemical mirror of claim 1, wherein reflectance of the electrochemical mirror is maintained even though 1,000 cycles or more of switching is performed, and the electrochemical mirror has a memory effect where reflectance is maintained even after an applied voltage is removed.

13. The electrochemical mirror of claim 1, wherein the transparent electrode is capable of being applied to a glass, polyethylene terephthalate (PET), or flexible substrate.

14. The electrochemical mirror of claim 1, wherein the electrolyte layer includes an ionic gel-phase electrolyte.

15. The electrochemical mirror of claim 14, wherein the ionic gel-phase electrolyte includes one kind or more polymers selected from polyvinylidene fluoride (PVDF), poly(vinylidene fluoride-co-hexafluoropropylene) (PVDF-HFP), polyvinylbutyral (PVB), and polyethylene glycol-polypropylene glycol-polyethylene glycol (PEG-PPG-PEG); and an ionic liquid.

\* \* \* \* \*